March 18, 1969  G. KING  3,433,142
IRISES

Filed Aug. 4, 1965

INVENTOR
Geoffrey King
BY Baldwin & Wight
ATTORNEYS

March 18, 1969     G. KING     3,433,142

IRISES

Filed Aug. 4, 1965     Sheet 2 of 3

INVENTOR
Geoffrey King
BY Baldwin & Wight
ATTORNEYS

March 18, 1969 G. KING 3,433,142
IRISES

Filed Aug. 4, 1965 Sheet 3 of 3

INVENTOR
Geoffrey King
By Baldwin & Wight
ATTORNEYS

United States Patent Office 3,433,142
Patented Mar. 18, 1969

3,433,142
IRISES
Geoffrey King, Chelmsford, Essex, England, assignor to The Marconi Company Limited, London, England, a British company
Filed Aug. 4, 1965, Ser. No. 477,163
Claims priority, application Great Britain, Aug. 14, 1964, 33,148/64
U.S. Cl. 95—12.20        11 Claims
Int. Cl. G03b 9/06, 33/00

ABSTRACT OF THE DISCLOSURE

An iris having a number of co-planar parts with mating edges which slide one on the other to vary the iris opening is provided in distinction to the generally used form of iris consisting of a number of overlapping parts wherein the extent of overlap determines the extent of iris opening. Movement of a number of co-planar parts at one speed and movement of others at another speed results in the provision of an elliptical iris opening.

---

Figure 1:
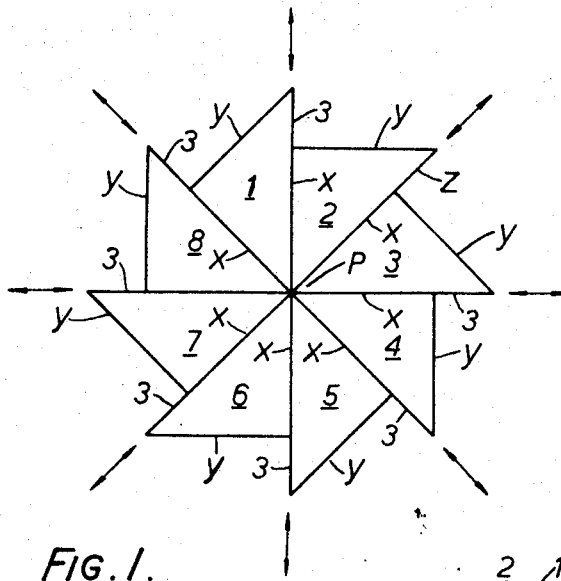

This invention relates to irises and has for its object to provide improved irises the parts of which are co-planar and which can, if desired, be so constructed that the opening can be reduced to zero, i.e. can be closed off altogether.

The generally used form of iris as commonly employed for such purposes as stopping off the lenses of cameras (including television cameras) consists of a number of overlapping parts the extent of overlap of which can be controlled to control the iris opening, which approximates closely to a circular opening, between minimum and maximum sizes. The minimum opening possible is not zero but of a definite finite size in any given design of iris. Moreover, because the parts overlap, the surround to the adjustable opening does not present a planar surface but presents a series of curved but sharp steps at the edges of the separate iris parts. These features limit the useful application of the generally employed forms of iris and makes then unsuitable for use for certain purposes, notably in connection with colour television cameras in certain colour television systems. In particular it makes them unsuitable for use in cases in which an iris is not required merely to control the cross-sectional area of a light beam but rather to divide an incident light beam into an emergent light beam and a reflected light beam to control the ratio of the areas of these two beams. Thus, for example, in one application of irises in a colour television camera arrangement in accordance with this invention, an incoming light beam is divided into an emergent beam and a reflected beam of different adjustable effective apertures. It would be convenient to satisfy this requirement by an iris having light reflecting parts surrounding the iris opening so that an incident beam falling upon the iris would be divided into two beams of adjustable ratio of areas, one being an emergent beam passing through the iris opening and the other a reflected beam reflected back from the iris parts surrounding the said opening. The common form of iris construction could not, however, be satisfactorily employed for the purpose of the invention in the said co-pending specification, even if the iris parts were made light reflecting because, owing to the overlap of these parts, they would not co-operate to form a planar reflecting surface of adjustable area. Furthermore, because of the finite size of the minimum opening of an iris of usual construction the range of adjustment is limited in the sense that the emergent (non-reflected) light beam cannot be cut off altogether by the iris, as is sometime desirable. In addition the shape of the opening of an iris of the usual construction always approximates to the circular, and the construction does not lend itself to the provision of adjustable openings approximating to other shapes e.g. elliptical, as is sometimes desired. The present invention seeks to provide improved irises which do not present these defects and limitations.

According to this invention an iris comprises a plurality of co-planar parts which are slidably mounted with respect to one another and each of which has an edge which slides on an adjacent edge of an adjacent part, the iris opening being defined by a figure bounded by variable lengths of the edges on which sliding takes place, control means being provided for sliding the said parts with respect to one another to vary said variable lengths and thereby the size of the iris opening.

Preferably the parts of the iris are triangular in shape, each having a side which slides along an adjacent side of the part next thereto.

Where an iris in accordance with this invention is required to divide an incident light beam into an emergent non-reflected beam and a reflected beam the parts of the iris are made light reflecting.

The means for sliding the parts of the iris with respect to one another preferably comprise means for positively driving certain of said parts along pre-determined paths of motion, the remaining parts of the iris being spring biassed and movable against said bias by the movement of positively driven iris parts between which they are situated. In a preferred construction of this nature alternate iris parts are positively driven and the remaining iris parts are spring biassed and moved against the bias by said positively driven alternate parts.

A preferred driving mechanism for positively driven parts of an iris in accordance with this invention comprises members fixed to said parts and movable along guides attached to a fixed member and extending parallel to the required direction of movement of said parts and common means for moving said members back and forth along said guides. Said common means may conveniently comprise racks fixed to said members, pinions engaging said racks and means, such as a chain, for rotating said pinions. Where the iris opening is required to approximate to the circular said common means are arranged to move said members back and forth at the same speed but where the opening is required to approximate to a shape other than circular said common means are arranged to move certain of said members at one speed and certain others thereof at another speed.

In a preferred construction the parts of the iris are of glass and are positioned adjacent a glass plate with a set of rollers between and bearing on said paths and said plate, a flexible resilient member being provided to maintain a substantially uniform desired contact pressure on the rollers.

Figure 2:
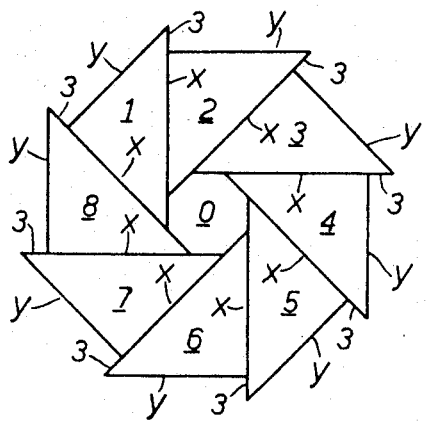
Figure 4:
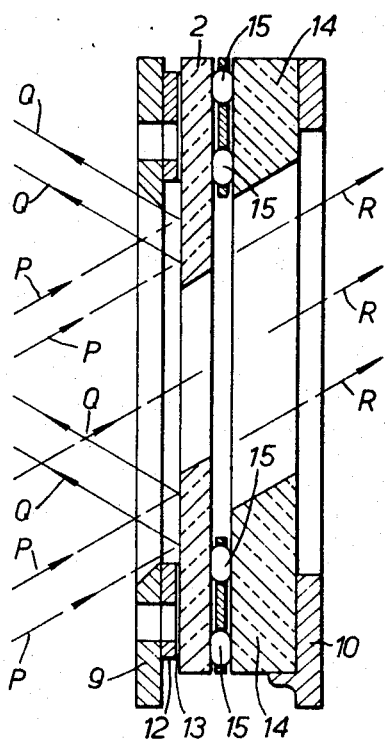
Figure 3:
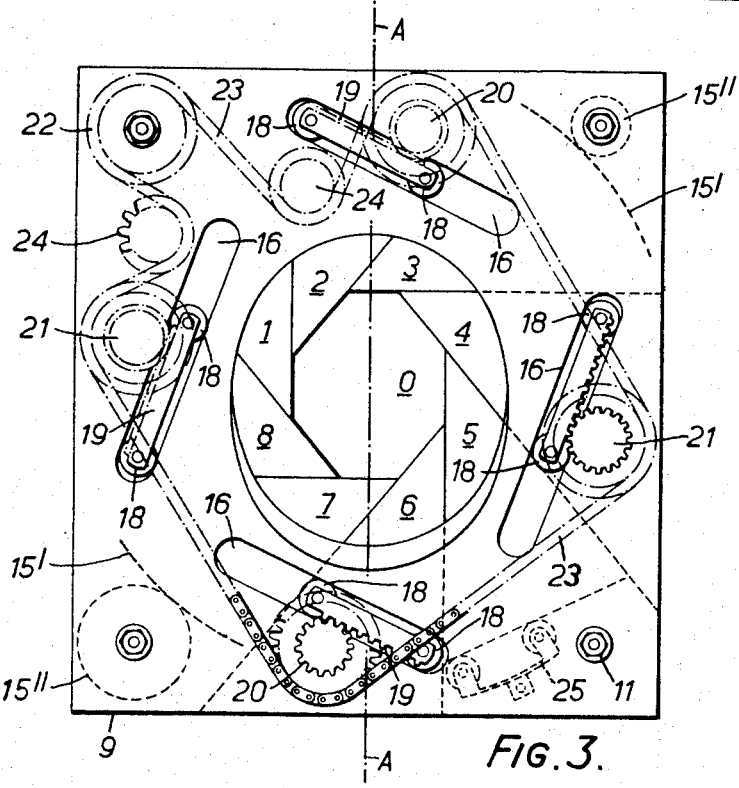
Figure 5:
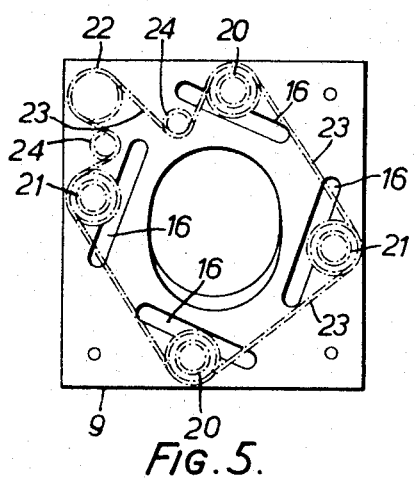
Figure 6:
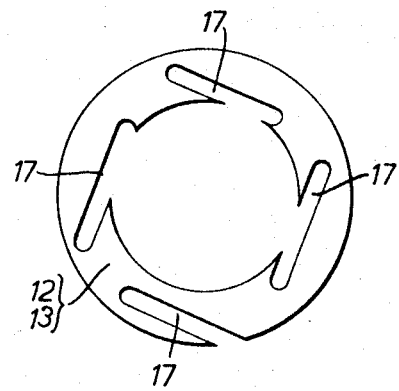
Figure 7:
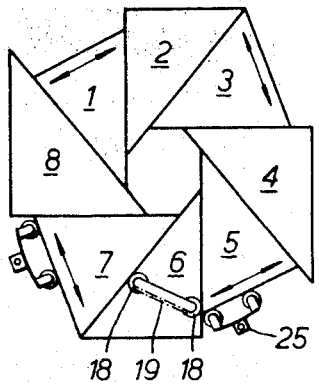

The invention is illustrated in the accompanying drawings in which FIGURES 1 and 2 are diagrammatic representations of one embodiment, FIGURE 1 showing the iris in fully closed position and FIGURE 2 showing it in partly opened position; FIGURE 3 shows a practical iris of the general nature of that shown diagrammatically in FIGURES 1 and 2; FIGURE 4 is a sectional view on the line A—A of FIGURE 3; and FIGURES 5 to 10 inclusive are views of different portions of the embodiment of FIGURES 3 and 4 separated to show the construction. Like references denote like parts throughout the figures. As will be understood later, the iris of FIGURES 3 to 10 inclusive is suitable for dividing an incident light beam into reflected and emergent beams of controllable area ratio and the iris opening, which can be reduced to zero, is polygonal and approximates in shape to elliptical. The invention is, however, not limited to these features and, as will be evident later, can be applied to provide non-reflecting irises and/or irises with other shapes of opening.

The highly simplified diagrammatic views of FIGURES 1 and 2 will first be described. The iris here represented consists essentially of a plurality of—as shown eight—coplanar triangular parts 1 to 8 inclusive. Each has three sides $x$, $y$ and $z$. The longest side $z$ of each part is slidable in the direction of its length along the adjacent side $x$ of the next part, the relative directions of sliding of the sides $z$ (relative, that is, to the adjacent sides $x$) being indicated in FIGURE 1 by double-headed arrows. When the iris is in fully closed position, as indicated in FIGURE 1, the apices of all the triangles meet at a common central point P. To open the iris the triangular parts 1 to 8 are caused to slide on one another in such manner as to withdraw the apices from the common central point and leave a variable opening O, as shown in FIGURE 2, which is polygonal and defined by variable portions of the sides $z$. The driving mechanism is not shown in FIGURES 1 and 2 but one form of such mechanism will be described with reference to FIGURES 3 to 10 inclusive. In the particular embodiment now being described the variable polygonal opening approximates to elliptical in shape. Obviously the larger the number of triangular parts (eight is given by way of example) the closer the polygon approximates to said shape. As will be clear later, because the opening is to be approximately elliptical in shape, all the iris parts are not driven at the same speed.

Figure 8:
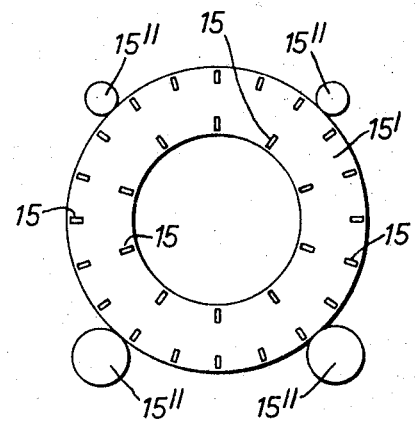
Figure 9:
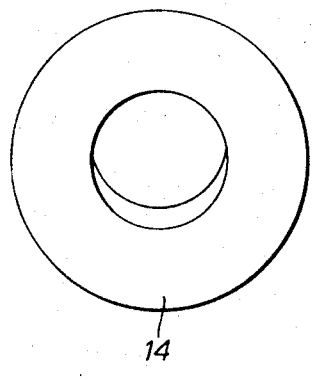
Figure 10:
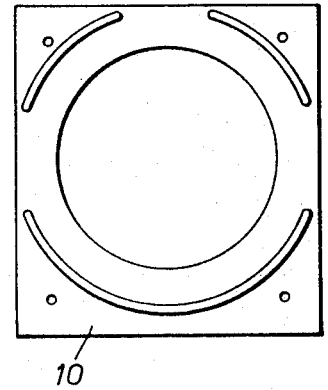

Referring now to the detailed FIGURES 3 to 10 inclusive, 9 and 10 are metal plate members of square shape which are held in parallel spaced relation by means of bolts 11 (not shown in FIGURE 4) on which are spacing tubes (not shown) which determine the required spacing of these plate members. The member 10 is shown separately, in inner face view, in FIGURE 10. Against the inner face of the member 9—i.e. the face thereof nearer the member 10—is a composite member, shown separately in FIGURE 6, shaped as shown in that figure, and consisting of a thin flexible material 13 of low coefficient of friction e.g. P.T.F.E., on a resilient material 12 such as foam plastic, the material 12 being towards the member 9. Next in order come the co-planar triangular iris parts 1 to 8 which are made of glass and are worked optically flat and have parallel optically flat faces. So as to avoid unnecessary complication of the figures the sides $x$, $y$ and $z$ are not referenced in FIGURES 3 to 10. Against the inner face of the member 10 is a substantial glass plate 14 having a hole as shown and which is worked optically flat on the face towards the iris parts 1 to 8. This plate is separately shown in FIGURE 9. Between the plate 14 on the one hand and the iris parts 1 to 8 on the other are needle rollers 15 in an annular retaining cage 15' which runs in locating rollers 15''. FIGURE 8 shows the needle roller and cage arrangement.

In the plate member 9 are cut four slots 16 and similarly positioned slots 17 are cut in the composite member 12, 13. The directions of length of the slots 16 are parallel to the required directions of motions of the alternate iris parts 2, 4, 6, 8 during adjustment of the aris opening O (FIGURE 2). The angular inclination and disposition of these slots will be noted. They are angled as shown because, although the sliding movement of any one of the parts 1 to 8, relative to the adjacent iris part, is in the direction of length of the meeting edges thereof (as indicated by the double headed arrows in FIGURE 1) the actual movement is at an angle to said direction of length because, of course, all the iris parts move and the actual movement of any one part is a compounded movement. These slots 16 serve, as shown, as guides for rollers 18, there being a pair of rollers in each slot 16. These pairs of rollers are attached to the alternate iris parts 2, 4, 6, 8, one pair to each part, the line joining the rollers of each pair being parallel to the direction of movement required for the iris part to which they are attached. Thus movement of any pair of rollers 18 along its slot 16 will cause the iris part to which that pair is attached to move in the required linear direction.

Movement of the pairs of rollers 18 along their slots 16 is produced by toothed racks 19 driven by pinions 20 and 21 which are mounted on stub spindles carried by the plate member 9. Rotation of the pinions 20 and 21 causes alternate iris parts 2, 4, 6, 8, to be postively moved in the required manner by the pairs of rollers attached thereto. Because, in the example illustrated, the iris opening is required to approximate to the elliptical in shape, half (2 and 6) of the alternate iris parts 2, 4, 6, 8, must be moved at one speed and the other half (4 and 8) must be moved at a different speed. Accordingly the number of teeth in the pinions is not the same, two of them—as shown the pinions 20—having a smaller number of teeth than the alternate pinions 21. If the iris opening were required to be approximately circular in shape all the pinions would be alike. All four pinions 20 and 21 are driven from a manually rotatable iris adjusting pinion 22 by means of a chain 23 which runs round them and over suitable idler pinions 24. Thus rotation of the driving pinion 22 positively imparts the required motions to the alternate iris parts 2, 4, 6, 8.

The four remaining alternate iris parts 1, 3, 5 and 7 are not positively driven but are spring biased towards their inmost positions and are moved in the required manner by sliding contact with the driven parts 2, 4, 6 and 8, being forced outwards thereby when said driven parts are moved outwardly. The spring bias biassing the parts 1, 3, 5 and 7 inwardly is applied by means of spring loaded pairs of rollers 25, one pair for each of these parts, and which press on the bases of the said parts. To ensure uniform spring loading the parts 1, 3, 5 and 7 are made a little different in shape from the parts 2, 4, 6 and 8, being wedge shaped and having the directions of length of their bases parallel to the directions of the movements (indicated by double headed arrows in FIGURE 7) which occur when the iris is adjusted.

The needle rollers 15' facilitate smooth and even movement of the parts 1 to 8 and the composite member 12–13 acts as a resilient pressure pad ensuring substantially uniformity of pressure of the iris parts 1 to 8 on the one hand and the plate 14 on the other, against the needle rollers.

In FIGURE 4 are shown typical light rays when the iris is employed to divide an incident light beam into an emergent beam and a reflected beam. As will now be apparent the area ratio of emergent beam to reflected beam may be adjusted to an extreme value in which the emergent beam is completely cut off and the incident beam is fully reflected. In FIGURE 4 rays of the incident beam are referenced P; rays of the reflected beam are referenced Q; and rays of the emergent beam are referenced R.

The invention is, of course, not limited to the particular arrangement illustrated and many modifications may be made, in particular as to the shape and number of iris parts, the materials employed, the details of the operating mechanism and the shape of the iris opening. The illustrated arrangement could be reversed to permit incident light to be projected from the side opposite from that shown in FIGURE 4. Again the glass plate 14 could be made without the central hole shown but if this is done it will normally be necessary to make the plate of optical quality glass with both faces flat and parallel.

As above stated an important application of the invention is in a colour television camera arrangement. Normally, when an iris in accordance with the present invention is used for this purpose, it will be required, under normal conditions of scene lighting, to maintain a predetermined fixed ratio between the effective apertures of the reflected light and emergent light beams, the emergent beam being focussed upon a luminance pick-up tube and the reflected light being divided, by reflection at suitably coloured interposed dichroic mirrors, between different colour pick-up tubes. The maintenance of the required fixed ratio between the effective apertures of the reflected and emergent light beam can be achieved by providing, in the path of the former beam, an additional iris the parts of which are opaque to light and may be in accordance with this invention or of known construction, which is gang controlled with the iris (in accordance with this invention) which controls the effective aperture of the emergent beam. The said additional iris may in practice conveniently be constituted by the normally already provided iris attached to the zoom lens, or other lens, of the camera.

It is of advantage to provide means for over-riding the gang control of the iris controlling the effective aperture of the emergent beam and the additional iris controlling the effective aperture of the reflective beam in order that, in conditions of poor lighting, such as fading daylight as often encountered in outside broadcasts, the iris controlling the effective aperture of the emergent beam can be progressively opened, as the light deteriorates, while leaving the effective aperture of the reflected beam at a maximum. This will, of course, result, as the light fails, in relatively progressively increasing the light passed to the luminance pick-up tube and relatively progressively decreasing that passed to the colour pick-up tubes so that the resultant picture reproduced by a co-operating television receiver will (as the light fades) change gradually from a fully coloured one to a black and white one which should, however be subjectively acceptable to the viewer. This ability to produce, albeit not coloured or not fully coloured, under conditions of poor and fading light, is a considerable practical advantage.

I claim:

1. An optical iris comprising a plurality of co-planar triangular parts, slidably mounted with respect to one another, each of said parts having a face terminated by side edges intersecting said face, side edges on each of said parts being in contact with and slidable on an adjacent edge of an adjacent part, the iris having expandable and contractible opening means for passing light therethrough, said opening means being defined by variable lengths of side edges on which sliding takes place, said iris defining means for dividing an incident light beam into an emergent non-reflected beam and a reflected beam including light reflective surfaces on said co-planar parts, and control means for sliding the said parts with respect to one another to vary said variable lengths of said edges and thereby the size of the iris opening, said control means for sliding the parts comprising means for positively driving alternate iris parts along pre-determined paths of motion, the remaining iris parts being spring-biased and moved against the bias by said positively driven alternate parts.

2. An iris as claimed in claim 1 wherein said means for positively driving parts of the iris comprise members fixed to said positively driven parts and movable along guides attached to a fixed member and extending parallel to the required direction of movement of said parts and common means for moving said members back and forth along said guides.

3. An iris as claimed in claim 2 wherein said common means comprise racks fixed to said members, pinions engaging said racks and means for rotating said pinions.

4. An iris as claimed in claim 3 wherein said common means include means for moving said members back and forth at the same speed for causing said opening to approximate a circular configuration.

5. An iris as claimed in claim 3 wherein said common means include means for moving certain of said members at one speed and certain others thereof at another speed for causing said opening to approximate a non-circular configuration.

6. An iris as claimed in claim 5 wherein the parts of the iris are of glass and are positioned adjacent a glass plate with a set of rollers between and bearing on said parts and said plate, a flexible resilient member being provided to maintain a substantially uniform desired contact pressure on the rollers.

7. A color television camera arrangement having an iris provided in the path of a light beam from a subject of transmission for splitting the beam into two beams one of which is emergent from the iris and passed to a luminance camera and the other of which is reflected by the iris and directed into branch paths, each of which leads to a different color camera, said iris comprising a plurality of co-planar parts, slidably mounted with respect to one another, each of said parts having a face terminated by side edges intersecting said face, side edges on each of said parts being in contact with and slidable on an adjacent edge of an adjacent part, the iris defining expandable and contractible opening means for passing light therethrough, said opening means being defined by variable lengths of side edges on which sliding takes place, control means for sliding the said parts with respect to one another to vary said variable lengths of said edges and thereby the size of the iris opening, means for maintaining a predetermined ratio between the effective apertures of the reflected and emergent beams including in the path of the reflected beam, an additional iris the parts of which are opaque to light and which is gang controlled with the iris controlling the effective aperture of the emergent beam.

8. An arrangement as claimed in claim 7 wherein the additional iris is constituted by the normally already provided iris attached to the zoom or other lens of the camera arrangement.

9. An arrangement as claimed in claim 7 and including means, operable at will for over-riding the gang control of the iris controlling the effective aperture of the emergent beam and the additional iris controlling the effective aperture of the reflective beam whereby, in conditions of poor lighting the iris controlling the effective aperture of the emergent beam can be progressively opened, as the light deteriorates, while leaving the effective aperture of the reflected beam at a maximum.

10. An optical iris comprising a plurality of plate-like segments, each of said segments having a face terminated by intersecting side edges, two of said side edges of each segment being in sliding contact with side edges of two further adjacent segments, the iris defining means for dividing an incident light beam into an emergent non-reflected beam and a reflected beam including adjustable opening means bounded by side edges of each of said segments for controlling the passage of light through said iris, each of said faces being planar and co-planar with corresponding faces on the remaining segments, said planar faces including light reflective surfaces defining a uniplanar segmented light reflective surface means for reflecting light incident thereon and control means for sliding the segments of the iris with respect to one another for varying said adjustable opening means including means for moving pre-determined ones of said segments at one speed and further segments at another speed for causing said opening to approximate a non-circular configuration.

11. An iris according to claim 10 wherein each segment is movable fully inwardly in sliding relation to adjacent segments to totally close the iris.

References Cited

UNITED STATES PATENTS

| | | | |
|---|---|---|---|
| 1,268,577 | 6/1918 | Jones | 95—64 X |
| 2,380,216 | 7/1945 | Carter | 95—64 |
| 3,246,586 | 4/1966 | Hunt | 88—24 |
| 3,284,566 | 11/1966 | James et al. | 178—5.4 |
| 2,043,292 | 6/1936 | Hillman | 88—1 |
| 2,578,229 | 12/1951 | Clement | 95—64 X |

JOHN M. HORAN, *Primary Examiner.*

U.S. Cl. X.R.

95—64; 88—1; 178—5.4; 343—756, 854